United States Patent
Szilagyi et al.

(10) Patent No.: US 9,961,585 B2
(45) Date of Patent: May 1, 2018

(54) NETWORK-SIDE BUFFER MANAGEMENT

(71) Applicant: NOKIA SOLUTIONS AND NETWORKS OY, Espoo (FI)

(72) Inventors: Peter Szilagyi, Budapest (HU); Csaba Vulkan, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days. days.

(21) Appl. No.: 14/280,012

(22) Filed: May 16, 2014

(65) Prior Publication Data

US 2015/0334596 A1    Nov. 19, 2015

(51) Int. Cl.
   H04L 12/28    (2006.01)
   H04W 28/02    (2009.01)
   H04L 12/801   (2013.01)
   H04L 12/823   (2013.01)

(52) U.S. Cl.
   CPC ......... H04W 28/0289 (2013.01); H04L 47/12 (2013.01); H04L 47/193 (2013.01); H04W 28/0273 (2013.01); H04L 47/17 (2013.01); H04L 47/323 (2013.01)

(58) Field of Classification Search
   None
   See application file for complete search history.

(56) References Cited

U.S. PATENT DOCUMENTS

| | | | | |
|---|---|---|---|---|
| 2007/0110016 A1* | 5/2007 | Shen | .................. | H04B 7/15542 370/338 |
| 2009/0016275 A1* | 1/2009 | Liu | ................... | H04W 72/1273 370/329 |
| 2009/0034488 A1 | 2/2009 | Takagi | | |
| 2010/0074111 A1* | 3/2010 | Krishnaprasad | ...... | H04L 69/163 370/231 |
| 2010/0158032 A1* | 6/2010 | Carlsson | ................. | H04L 47/10 370/412 |
| 2010/0232427 A1* | 9/2010 | Matsushita | ............. | H04L 47/10 370/389 |
| 2012/0120805 A1* | 5/2012 | Maze | .................... | H04L 1/1835 370/235 |

(Continued)

FOREIGN PATENT DOCUMENTS

CN    103583026 A    2/2014
EP    2 579 516 A1   4/2013

OTHER PUBLICATIONS

Allman, et al., "TCP Congestion Control", RFC 5681, Standards Track, Sep. 2009, 18 pages.

(Continued)

*Primary Examiner* — Anh-Vu Ly
(74) *Attorney, Agent, or Firm* — Squire Patton Boggs (US) LLP

(57) ABSTRACT

Various communication systems may benefit from buffer management. For example, systems employing a packet data convergence protocol may be enhanced with network-side buffer management that is configured to manipulate transmission control protocol packet senders. A method can include receiving a plurality of packets at a buffer of a buffer manager. The method can also include manipulating, by the buffer manager, pacing of transmission control protocol senders of the packets. The method can further optionally include fair queuing the packets and/or performing flow incubation on the packets.

17 Claims, 10 Drawing Sheets

(56) References Cited

U.S. PATENT DOCUMENTS

| | | | | |
|---|---|---|---|---|
| 2013/0215750 A1* | 8/2013 | Beecroft | ............... | H04L 47/11 370/235 |
| 2014/0016461 A1* | 1/2014 | Ishikawa | ............... | H04L 47/17 370/230 |
| 2014/0269302 A1* | 9/2014 | Morandin | ............... | H04L 47/27 370/235 |
| 2014/0286258 A1* | 9/2014 | Chowdhury | .......... | H04L 1/1812 370/329 |

OTHER PUBLICATIONS

Braden et al., "Recommendations on Queue Management and Congestion Avoidance in the Internet", RFC 2309, Informational, Apr. 1998, 17 pages.
S. Floyd, V. Jacobson, "Random Early Detection Gateways for Congestion Avoidance", IEEE/ACM Transactions on Networking, vol. 1, No. 4, Aug. 1993, pp. 397-413.
K. Nichols, V. Jacobson, "Controlled Delay Active Queue Management", Internet Draft, Mar. 3, 2014, 54 pages.
R. Pan et al., "PIE: A Lightweight Control Scheme to Address the Bufferbloat Problem", Internet Draft, Dec. 10, 2012, 24 pages.
K. Ramakrishnan et al., "The Addition of Explicit Congestion Notification (ECN) to IP", RFC 3168, Standards Track, Sep. 2001, 62 pages.
3GPP TS 25.323, "Universal Mobile Telecommunications System (UMTS); Packet Data Convergence Protocol (PDCP) specification", version 11.0.0, Release 11, Sep. 2012, 45 pages.
Csaba Deák et al "TCP Performance Improvement in Mobile Networks with Coverage Problems"; International Conference on Communication (ICC'13); pp. 2303-2308; Jun. 9, 2013; ISBN: 978-1-4673-3122-7.
European Examination Report issued in corresponding European Application No. 15 166 349.9 on May 16, 2017.
Anonymous, "Flow Incubation" networks, Google Search; 2017; XP055369643.
Anonymous, "Flow Incubation" networks, Google Search; 2017; XP055369645.
Anonymous, "Flow Incubation" networks, Google Search; 2017; XP055369647.
Feyza Keceli, et al.; "TCP ACK Congestion Control and Filtering for Fairness Provision in the Uplink of IEEE 802.11 Infrastructure Basic Service Set"; Proceedings of the 2007 IEEE International Conference on Communications (ICC 2007); pp. 4512-4517.
European Search Report application No. 15166349.9 dated Sep. 30, 2015.
State of Intellectual Property Office, P.R. China, Office Action corresponding to Appln. No. 201510247458.1, dated Dec. 25, 2016.

* cited by examiner

NETWORK-SIDE BUFFER MANAGEMENT

BACKGROUND

Field

Various communication systems may benefit from buffer management. For example, systems employing a packet data convergence protocol may be enhanced with network-side buffer management that is configured to manipulate transmission control protocol packet senders.

Description of the Related Art

In third generation partnership project (3GPP) radio access systems such as wideband code division multiple access (WCDMA)/high speed packet access (HSPA) and long term evolution (LTE), a convergence point between the mobile backhaul, as well as the corresponding transport network protocols, and the radio access, including the air interface protocol stack, is the packet data convergence protocol (PDCP) layer. This layer is at the top of the user plane Radio Network Layer 2 protocol stack. The location depends on the radio access technology. It is located at the evolved node B (eNB) in LTE systems, at the HSPA+ base transceiver station (BTS) in evolved HSPA systems, or at the radio network controller (RNC) in WCDMA/HSPA systems. For each radio bearer, a separate PDCP entity is created that, among other tasks, stores the downlink data until the transfer to the UE is completed by the radio link control (RLC) layer below. User equipment (UEs) may establish one or more radio bearers, which are logically separate channels of data and which potentially require different treatment by the air interface packet scheduler. However, there is a one-to-one mapping between a PDCP buffer and a radio bearer.

Applications running on mobile devices predominantly use the transmission control protocol (TCP) as the transport protocol to download content from the Internet. The TCP is a greedy protocol that regularly increases its transmission rate in order to experimentally probe for the maximum available bandwidth between the sender and the receiver. Provided that sufficient amount of data is available for transmission, at some point the TCP will reach the limitation imposed by the bottleneck link and its buffer within the end-to-end path. In 3G/LTE systems, the bottleneck is often the radio interface. Thus, data is accumulated in the PDCP buffer in response to the bottleneck. The TCP also tends to transmit data in bursts, which may reach considerable size given the possibility and high penetration of window scaling. In case data cannot be transmitted from the buffer faster than it arrives, the buffer eventually overflows and the exceeding packets are tail dropped. Tail drop is an efficient technique to handle buffer overload, however its negative impacts on the data flows can be quite significant in case of sources that operate based on the feedback received from their clients. TCP is an example of the impacts of the tail drops that can cause efficiency and fairness issues such as flow synchronization, congestion collapse and poor fairness. Because of this sensibility, packet discards as buffer management mechanism may not be the best technique, for example when applied to the PDCP buffers shared by a few concurrent flows of the same UE.

A common reaction of the equipment vendors and network operators to tail drops was to increase the buffer size throughout the network to avoid tail drops; accordingly, the PDCP buffers are nowadays being inflated up to multiple Megabytes. Increased buffer sizes have created what is referred to as the "bufferbloat," which occurs when large amount of data is stored in the buffer.

Bufferbloat causes increased queuing delay and end-to-end latency, which degrades the experience of interactive applications, such as web browsing or chat. Increasing the buffers alone has also failed to eliminate tail drops altogether. On the contrary, when tail drops occur at a large buffer, they tend to have more drastic impact, as they end up discarding more data and the TCP connections can reach even larger window size, thus sending larger bursts, before they hit the buffer limitation. Additionally, the increased round trip time caused by these buffers has an impact on the efficiency of the TCP flow/congestion control as it will detect congestion with delay, once the excess packets at the overloaded links overflow the long buffers.

The RNC PDCP buffer has no standardized management technique, leaving tail drop as the only mechanism to trigger the TCP congestion control. In LTE, the standard PDCP buffer management mechanism is the discard timer, which drops all PDUs that have been buffered for longer than a given time interval. This mechanism, however, does not interact well with TCP traffic, as it discards packets in bursts, similarly to tail drops, and it does not address the bufferbloat issue either.

Generic buffer management mechanisms commonly referred to as active queue management (AQM), such as random early detection (RED) or controlled delay (CoDel) were also applied for PDCP buffer management. The AQMs were designed for the core Internet infrastructure to manage transport buffers and enforce TCP fairness at high capacity aggregation links, where a large number of concurrent TCP connections, in the order of hundreds or thousands, are multiplexed on the same link and share the same buffer. The principle of all AQMs is thus based on probabilistic discards applied randomly to whatever packet happens to arrive at or transmitted from the managed buffer. This may be a reasonable behavior on an aggregation link where there are many concurrent flows that distribute the impact of random discards. However, applying these mechanisms to the PDCP buffers may be a misuse as the prerequisite of their efficient operation, as there may be high number of parallel flows with different sources and destinations. Such efficient operation may not fulfilled by the PDCP buffers that are usually shared only by a few concurrent TCP connections with the same destination, such as a given UE. Therefore, when the AQMs are applied to the PDCP buffer, their random-discard-based behavior may start to be problematic as they might cause repeated drops from the same connection, cannot prevent tail drops and/or buffer bloat and due to the limited diversity way too often discard packets from TCP connections serving the same interactive application of the user. The latter may cause significant QoE degradation.

Currently there is no efficient buffer management mechanism for PDCP buffers in LTE or WCDMA systems. Efficient buffer mechanism in this context can mean that: (1) the amount of tail drops that are causing TCP degradation is reduced or completely eliminated; (2) fairness is maintained; and (3) QoE implications are minimal. None of the available buffer management mechanism fulfils this criteria due to the below reasons.

SUMMARY

According to certain embodiments, a method can include receiving a plurality of packets at a buffer of a buffer manager. The method can also include manipulating, by the buffer manager, pacing of transmission control protocol senders of the packets. The method can further optionally include fair queuing the packets and/or performing flow incubation on the packets.

In certain embodiments, an apparatus can include an input configured to receive a plurality of packets at a buffer of a buffer manager. The apparatus can also include a buffer manager configured to manipulate pacing of transmission control protocol senders of the packets and optionally to fair queue the packets and/or perform flow incubation on the packets.

An apparatus, according to certain embodiments, can include means for receiving a plurality of packets at a buffer of a buffer manager. The apparatus can also include manipulating, by the buffer manager, pacing of transmission control protocol senders of the packets. The apparatus can further optionally include fair queuing the packets and/or performing flow incubation on the packets.

A non-transitory computer-readable medium can, in certain embodiments, be encoded with instructions that, when executed in hardware, perform a process. The process can include receiving a plurality of packets at a buffer of a buffer manager. The process can also include manipulating, by the buffer manager, pacing of transmission control protocol senders of the packets. The process can further optionally include fair queuing the packets and/or performing flow incubation on the packets.

A computer program product can, in certain embodiments, encode program instructions for performing a process. The process can include receiving a plurality of packets at a buffer of a buffer manager. The process can also include manipulating, by the buffer manager, pacing of transmission control protocol senders of the packets. The process can further optionally include fair queuing the packets and/or performing flow incubation on the packets.

BRIEF DESCRIPTION OF THE DRAWINGS

For proper understanding of the invention, reference should be made to the accompanying drawings, wherein.

DETAILED DESCRIPTION

Figure 1:
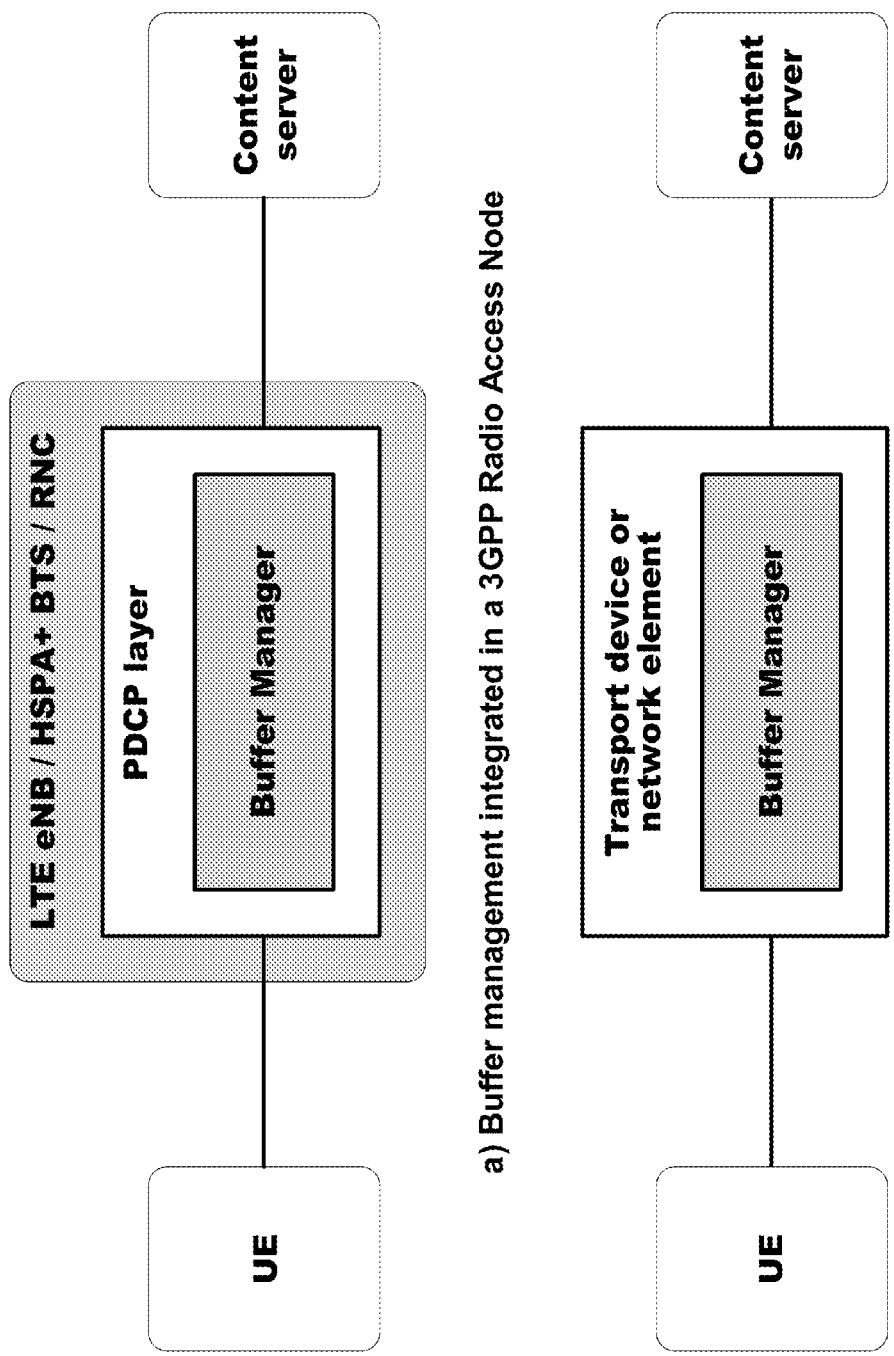
FIG. 1 illustrates deployment alternatives of a buffer manager according to certain embodiments.

Certain embodiments provide a buffer management mechanism that is especially fitted for the management of the PDCP buffer. Instead of using early discards as a control action, the transmission rate of the TCP senders can be controlled by supervising and adjusting the rate of the corresponding ACK flow, a mechanism referred to as ACK shaping. The ACK shaping can be a non-intrusive mechanism that enables smooth control of the TCP connections, either for slow down or speed up, according to the depletion rate of the managed buffer, ensuring that data does not arrive at the buffer faster than it is consumed.

Besides ACK shaping, certain embodiments provide an additional control mechanism, referred to as the virtual discard. The virtual discard can trigger the congestion control mechanism of the TCP senders with the lowest latency that is theoretically possible, faster than any of the prior AQMs do, without actually discarding any data segment. The virtual discard can be triggered selectively on the TCP flows that have the highest throughput among the competing flows to ensure the efficiency of the action and to preserve the performance of short interactive flows.

A third component of certain embodiments of a buffer management mechanism incorporates fair queuing to eliminate negative impacts of bufferbloat without degrading the efficiency of bulk downloads.

Certain embodiments may both maximize system efficiency by preventing buffer under-utilization through avoiding to too aggressive actions and may improve the fairness among the competing flows by eliminating tail drops.

Thus, certain embodiments may provide a non-intrusive buffer management mechanism that has superior performance in many aspects: it may prevent tail drops, it may enforce fairness among the concurrent TCP connections, it may reduce the negative impact of bufferbloat without limiting the achievable throughput, and it may minimize the QoE impacts.

More particularly, certain embodiments may provide a buffer manager entity that is integrated with the managed buffer in order to smoothly control the TCP connections sharing the buffer. The buffer manager may be configured to enable efficient system operation but also to avoid bufferbloat and particularly buffer overflow that would result in extensive tail drops. Thus, the buffer manager may be configured to keep the buffer lightly loaded. This goal is achieved by manipulating the pacing of the TCP senders, that is, not via discarding packets. By eliminating tail drops, the buffer manager reduces the possibility of TCP congestion control synchronization and the conservation of inequalities among the TCP connections. Additionally, the buffer manager can implement fair queuing to further increase the fairness and to support the start-up and interactivity of short flows.

Certain embodiments relate to the management of the PDCP buffers in the LTE eNBs, due to the high data rates offered by LTE and the large PDCP buffers nowadays used in the eNBs. Also certain embodiments relate to the management of the PDCP buffers of the HSPA+ BTS or 3G/HSPA RNC are also in the scope of the proposed mechanism. Thus, certain embodiments can manage the PDCP buffers at eNBs, HSPA+ BTSs, and RNCs where the standard discard timer, the AQMs, and threshold based discard mechanisms all previously performed poorly. Accordingly, certain embodiments of a buffer manager may be implemented in a corresponding protocol layer.

Further, certain embodiments of the buffer management may be able to supervise the packet buffers in any transport network element, such as transport routers or other network elements. For example, the buffer manager can be deployed in a standalone middle-box or traffic forwarding node such as part of a transport router, to handle the connections going through the node.

FIG. 1 illustrates deployment alternatives of a buffer manager according to certain embodiments. As shown in FIG. 1 at (a), a buffer manager can be implemented at a PDCP layer in a radio access network (RAN) node. Additionally, or alternatively, as shown at (b), the buffer manager can be implemented in transport devices or other network elements To prevent buffer overflow and tail drops, or for other reasons, a buffer manager can operates two complementary mechanisms: an ACK shaper that is continuously active and an optional virtual discard that, if enabled, is triggered in case the buffer load becomes high, such as at or above a certain threshold.

Additionally, the buffer manager can implement fair queuing, which can be specially adapted to the context of the ACK shaper. Both the ACK shaper and the virtual discard can rely on the buffer manager monitoring the load of the managed buffer, such as the amount of buffered data as compared to the buffer size. For the operation of the ACK shaper, the buffer manager can also measure the cumulative depletion rate of the buffer, namely the rate at which data is transferred from the buffer. In addition, the optional virtual discard mechanism may utilize a per-flow measurement of the incoming rate, namely the rate at which data is arriving at the buffer in each connection. This measurement may be used when the virtual discard mechanism is enabled.

Figure 2:
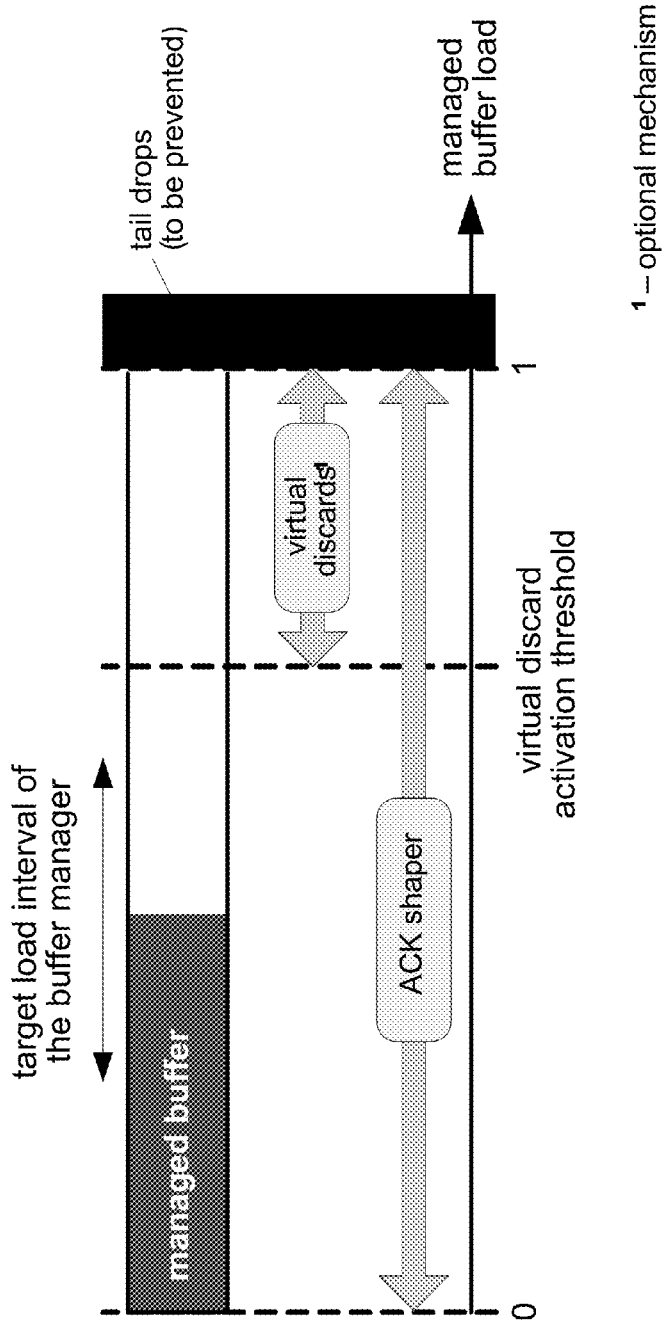
FIG. 2 illustrates an operational domain of an ACK shaper and a virtual discard mechanism, according to certain embodiments.

FIG. 2 illustrates an operational domain of an ACK shaper and a virtual discard mechanism, according to certain embodiments. As shown in FIG. 2, an ACK shaper may operate over an entire working size of a buffer. If the managed buffer load exceeds that working size, there may be tail drops. Prior to the managed buffer reaching that working size, the managed buffer may encounter a virtual discard activation threshold. The virtual discard mechanism may operate from the threshold to the maximum working size of the buffer.

Figure 3:
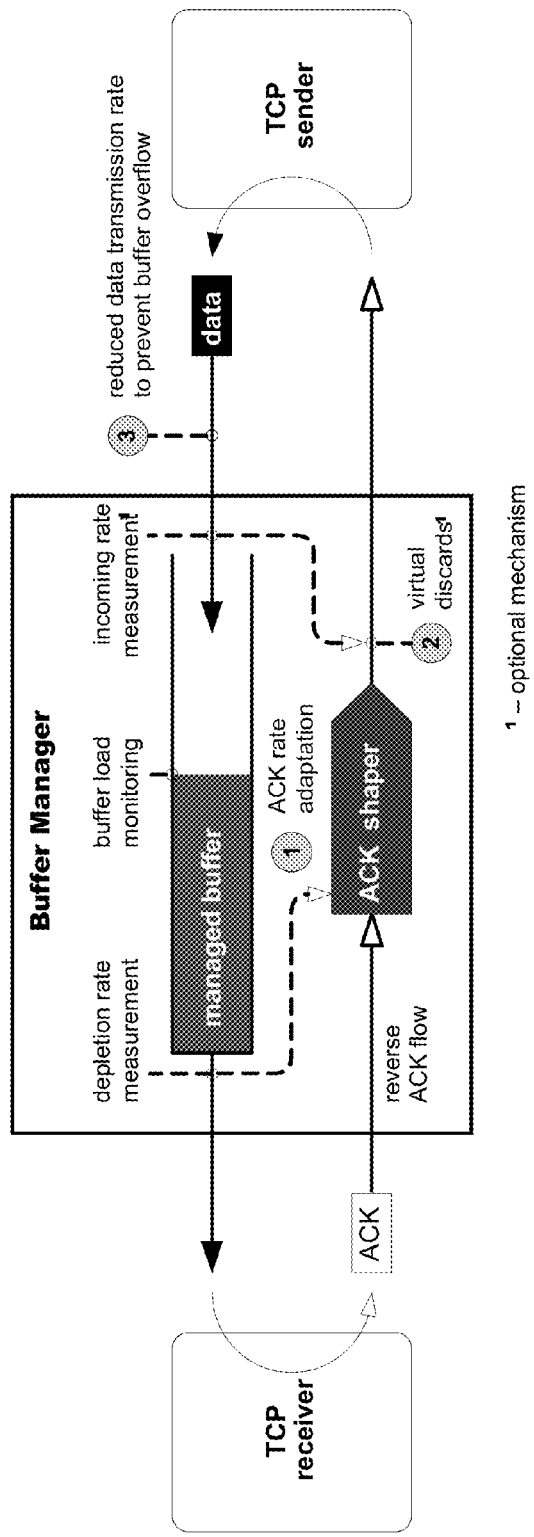
FIG. 3 illustrates control mechanisms used by the buffer manager to smoothly adjust the rate of the TCP senders, according to certain embodiments.

FIG. 3 illustrates control mechanisms used by the buffer manager to smoothly adjust the rate of the TCP senders, according to certain embodiments. As shown in FIG. 3, the ACK shaper mechanism can manipulate the pacing of the TCP connections through the shaping of the reverse ACK flow.

In order to control the buffer load within the PDCP buffer, that is, to ensure that the rate of the incoming data is not higher than the rate at which data can be transferred from the buffer, the shaping rate of the ACKs, and thus the data rate of the connections, can be dynamically adjusted to the momentary depletion rate of the managed buffer. This control loop may be effective in preventing tail drops through exploiting the self-clocking property of the TCP, namely that the TCP sender is allowed to transmit new data only if the TCP sender receives an ACK. Therefore, the cumulative transmission rate of the TCP senders can be controlled based on their matching the depletion rate of the buffer via the enforced rate of the ACKs.

The ACK shaping mechanism can be cumulatively applied to all flows sharing the managed buffer. Thus, there may be no need to implement and maintain more costly per-flow shapers. The ACK shaper mechanism of the buffer manager can be continuously active, ensuring that the load of the managed buffer is always kept under control.

The ACK shaper can be an effective mechanism to manage the buffer when the buffer is shared by multiple concurrent TCP connections. As the shaping rate is applied to the cumulative reverse ACK flow, the shaping rate can be a suitable instrument to control the cumulative rate of data incoming to the buffer.

An optional control mechanism that the buffer manager may utilize in addition to the ACK shaping is a virtual discard mechanism. The virtual discard can operate by inserting duplicate ACKs, which may be identical copies of already transmitted ACKs, in the reverse ACK flow, creating a fake signaling of packet loss towards the TCP sender. This fake signaling can be a reason for the name "virtual", as no data segments need to be actually discarded. When the TCP sender receives the inserted duplicate ACKs, the congestion control mechanism of the TCP sender can reduce the sending rate immediately. The virtual discard can trigger the TCP sender's congestion control mechanism in the fastest way theoretically possible: as virtual discard manipulates the ACKs, the latency of the virtual discard equals the one way delay between the PDCP buffer and the traffic sources. Thus, the latency of the virtual discard can have shorter latency than a data segment discard-based AQM mechanism, including those that discard the head of line packet instead of incoming ones.

The merit of certain embodiments of the virtual discard is to achieve TCP congestion control without discarding any segment, and to do so with the lowest latency theoretically possible. Other options are possible along with the example of duplicated ACKs for sending this fake signaling. As noted herein, there can be at least two possibilities to convey the trigger to the TCP sender, the injection of artificial duplicate ACKs for non-ECN capable transport and using ECN for ECN capable transport. Additional mechanisms are also be possible, such as including an extension to TCP itself or including an additional TCP option field. These alternatives may require the modification of the TCP stack. Other alternatives are permitted.

Additionally, as the virtual discard does not really discard data segments, the virtual discard can be free from the common inefficiency problem of AQMs operating via front drops that keep a packet in the buffer all the way, consuming valuable buffer space and processing resources, to discard it just when it could finally be transmitted from the buffer. The virtual discard mechanism may be triggered only in case the buffer load increases above a given threshold to provide a final control mechanism to quickly reduce the incoming data rate at the buffer. To ensure the efficiency of the virtual discard, virtual discard can be applied selectively on the connections that carry the majority of the incoming data arriving at the buffer. The selection can be based on the per-flow incoming rate measurement.

The virtual discard may have no negative impact on short interactive flows, as they may not be selected for the virtual discard. On the other hand, the virtual discard can be an efficient mechanism to quickly restrain the throughput of the heavy TCP senders. Additionally, as no packets are really discarded, a user equipment (UE) can still receive an in-sequence data flow without having to buffer out-of-order data segments, which enables continuous uninterrupted processing by the applications.

In addition to the ACK shaper and virtual discard mechanisms, the buffer manager can also implement fair queuing (FQ) to further improve the fairness among the long lived connections. Moreover, the FQ mechanism can reduce the queuing delay experienced by new flows during their start-up, improving the interactivity of short flows without causing throughput degradation for the bulk transmissions.

As mentioned above, the buffer manager according to certain embodiments can provide a mechanism that keeps the load of the managed buffer under control by adjusting the incoming rate, namely the rate at which data is arriving at the buffer, to the depletion rate, namely the rate at which data is transferred from the buffer. The buffer manager can, for example, control the rate of the reverse ACK flow according to the measured depletion rate and the buffer load.

The principle of operation of the ACK shaper can be that the higher the buffer load, the lower the rate at which the ACKs are forwarded to the TCP senders. This control mechanism can smoothly slow down the TCP senders as the buffer load increases, implementing a load based negative feedback. When the buffer load is low, the rate of the ACKs may be unrestricted to enable efficient system operation by encouraging data transmission at the highest rate achievable. The buffer manager can implement an additional optional mechanism, the virtual discard, in order to efficiently reduce the sending rate of the TCP senders that are the major contributors for the high buffer load.

Figure 4:
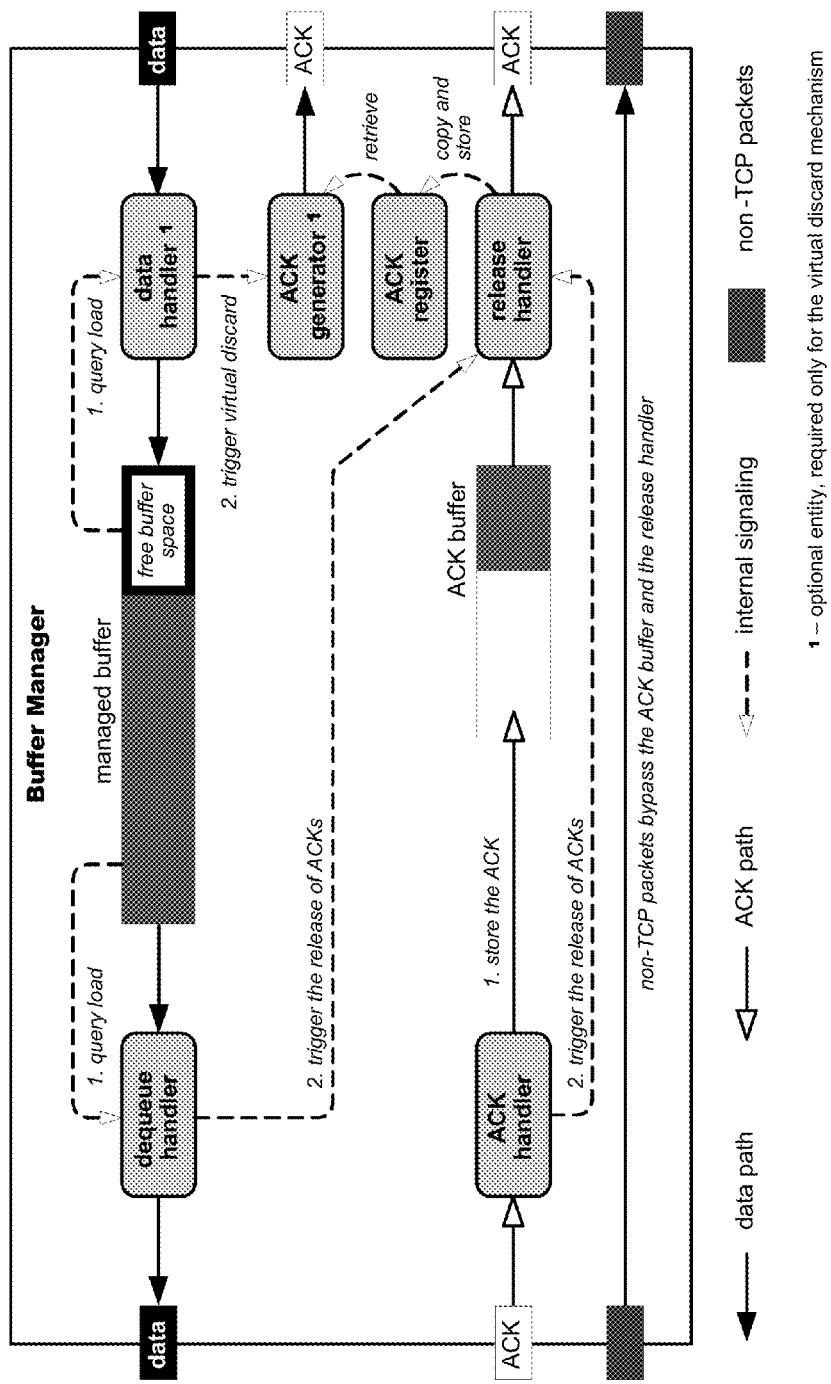
FIG. 4 illustrates the architecture and basic operation of an ACK shaper internal to a buffer manager, according to certain embodiments.

FIG. 4 illustrates the architecture and basic operation of an ACK shaper internal to a buffer manager, according to certain embodiments. The buffer manager can logically encapsulate the managed buffer so that it is aware of data incoming to the buffer as well as data transmitted from the buffer. Additionally, the buffer manager can intercept the reverse packet flow in order to enable the shaping of the ACKs. The ACK shaper can apply in common to all TCP connections sharing the managed buffer. Thus, no per-flow shaper is required in certain embodiments.

The shaper can include a first-in first-out buffer to store ACKs that are not yet eligible for transmission. The additional memory requirements of the ACK buffer may be negligible compared to the memory requirement of the managed buffer itself as the ACK segments may be orders or magnitude, for example about 30 times, smaller than data segments. The storing and scheduling of the ACKs, such as when to de-queue and forward an ACK from the buffer, can be managed by three logical entities referred to as the ACK handler, the dequeue handler and the release handler.

The ACK handler can intercept the reverse ACK flow and store each ACK in the ACK buffer in the order of their arrival. The dequeue handler can intercept data transferred from the managed buffer and can trigger the release of ACKs from the ACK buffer to couple the rate at which ACKs are sent towards the TCP senders with the depletion rate of the managed buffer. The release of ACKs can be triggered through the release handler entity, which has the responsibility of storing a copy of the latest ACK released from the ACK buffer for each TCP connection separately in the ACK register.

Only one ACK, the latest one, may be kept for each connection. The latest ACK thus may always overwrite the connection's ACK register. The ACK register can have dual scope. The ACK register can enable handling of reverse ACKs that are piggybacked on data segments. The ACK register can also support an optional virtual discard mechanism by providing the input for the duplicate ACK generation. The remaining two logical entities, the data handler and the ACK generator, can also be required for the implementation of the virtual discard.

More detailed discussion of certain illustrative embodiments follows. First, the operation of the buffer manager is discussed in the context of one-way TCP senders that transmit data in the direction of the managed buffer and receive pure ACKs in the reverse direction. Second, an extension of the buffer manager to handle duplex TCP connections is discussed, in which the reverse ACKs may be piggybacked on data segments. Third, the implementation of the optional virtual discard mechanism is discussed. Finally, examples of implementation of fair queuing are provided.

Figure 5:
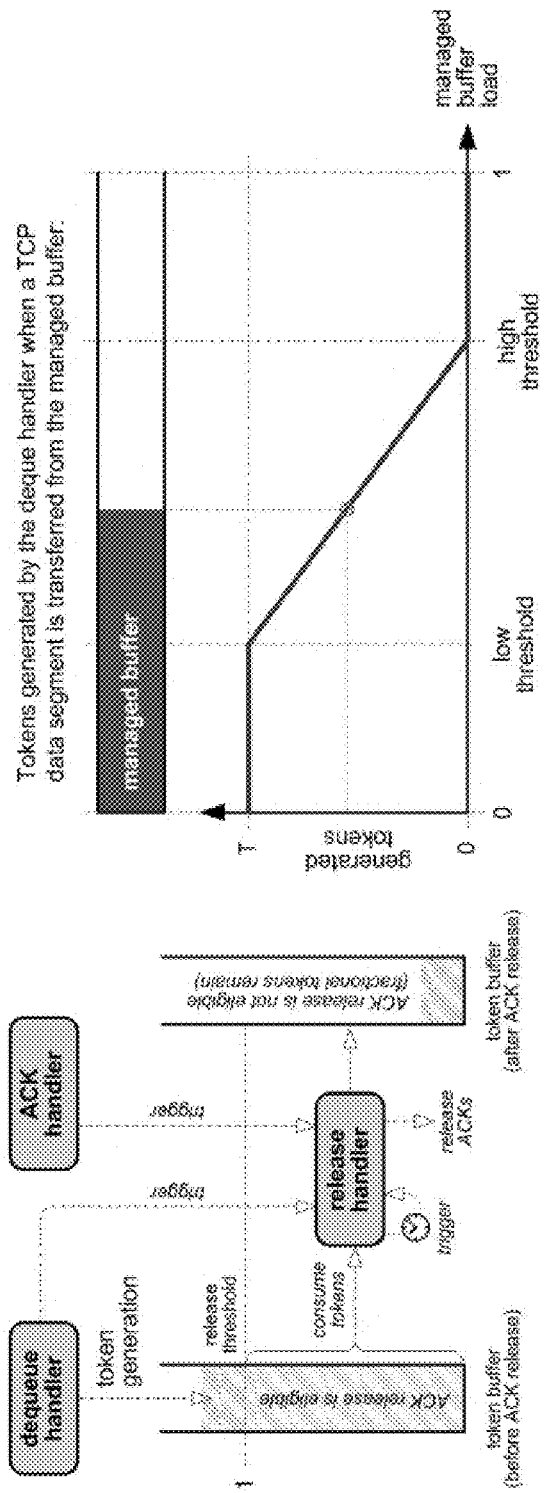
FIG. 5 illustrates control of a rate of an ACK shaper based on a depletion rate of a managed buffer using a token bucket buffer, according to certain embodiments.

FIG. 5 illustrates control of a rate of an ACK shaper based on a depletion rate of a managed buffer using a token bucket buffer, according to certain embodiments. The dequeue handler can generate tokens each time a TCP data segment is transferred from the managed buffer. One token can directly correspond to one ACK that may be released from the ACK buffer. The transfer of non-TCP packets or pure TCP ACKs from the buffer can be handled transparently by the ACK shaper not generating any token upon the transmission of such packets or ACKs.

The amount of tokens generated each time can be a function of the momentary load of the managed buffer and additional configuration parameters. The token generation function can be defined by two load thresholds, which can be referred to as low and high thresholds. In case the buffer load is below the low threshold, the amount of generated tokens can be directly given by a configuration parameter, which can be referred to as T. As the load increases from the low to the high threshold, the amount of generated tokens can linearly decrease from T to zero.

If the load is above the high threshold, no tokens may be generated by the ACK shaper. Note that fractional tokens can also be generated when, for example, the token bucket is implemented by a floating point counter, although other ways of implementing fractional tokens are also permitted.

Practical values for the parameters can be T=1.25, low threshold=0.5 and high threshold=0.85.

As illustrated in FIG. 5, ACKs can be released from the beginning of the ACK buffer each time enough tokens are available, at least one token is available, in the token buffer. There can be two triggers for checking this condition: first, when new tokens are generated, which can be a trigger from the dequeue handler; and second, when ACKs are received and stored in the ACK buffer, which can be a trigger from the ACK handler. The number of ACKs released upon each trigger can be the minimum of the integer part of the tokens and the number of ACKs in the buffer. Each released ACK can reduce the amount of tokens by one. In case the managed buffer has become empty and all the ACKs have been released, the remaining tokens, if any, can be maintained rather than being discarded. These tokens can be used next time when the data transfer continues in the bearer and the corresponding ACKs are received.

Additionally, the release handler can implement a safety measure to prevent ACKs being stuck in the ACK buffer. It may happen that even though no tokens are available and the managed buffer is empty, for example there is no expectation for generating new tokens either, there are still ACKs in the ACK buffer or new ACKs are being received. These ACKs can be released or forwarded despite having no tokens as they have no risk of causing buffer management problems. On the other hand, the delay of such ACKs could limit the performance of the data transfer. The release handler can detect these criteria and can release the remaining ACKs one by one, enforcing a minimum gap time between each ACK, for example using a timer, to smooth ACK bursts. Additional ACKs received subsequently can also be forwarded by the release handler by enforcing the same gap time between the ACKs.

Each time the release handler transfers an ACK from the ACK buffer, the release handler can update the ACK register with the copy of the ACK. The ACK register can store the latest ACK separately for each TCP connection.

In order to prevent the TCP senders from timeout in case no tokens are generated such as when the depletion of the managed buffer is temporarily stopped, the buffer manager can send zero window advertisement (ZWA) ACKs in the active connections to force the TCP senders into persist mode. During persist mode, the TCP senders are configured not to start recovery or enter slow start even if their RTO timer would normally expire. When data can be transmitted again from the buffer, ACKs with non-zero window advertisement (NZWA) can be released from the ACK buffer and the TCP senders can continue data transmission. In case there are no buffered ACKs for a given connection, the TCP sender can send a zero window probe segment before the transmission of new data. The TCP receiver can respond with a NZWA to the TCP sender, which, in turn, can continue the transmission. This use of NZWA can ensure that none of the TCP senders remain stuck in persist mode. This mechanism can be referred to as a TCP freeze. Further details regarding TCP freeze are discussed in Cs. Deák, Á. Drozdy, P. Szilágyi, Z. Vincze and Cs. Vulkán, "TCP Performance Improvement in Mobile Networks with Coverage Problems", International Conference on Communication (ICC'13), pp. 2303-2308, Jun. 9, 2013, Budapest, Hungary, which is hereby incorporated herein by reference.

Figure 6:
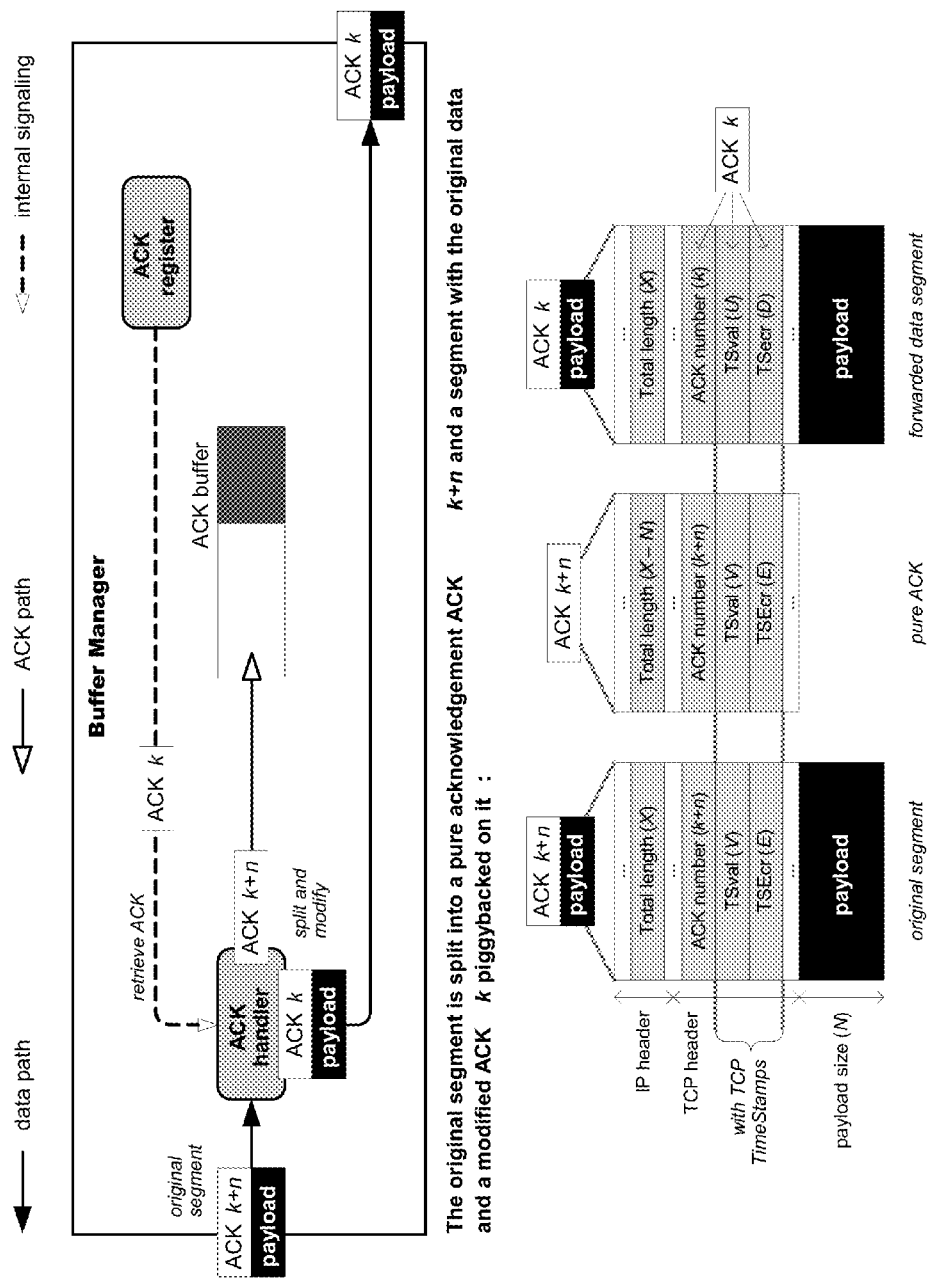
FIG. 6 illustrates handling of reverse ACKs piggybacked on data segments, according to certain embodiments.

FIG. 6 illustrates handling of reverse ACKs piggybacked on data segments, according to certain embodiments. The buffer manager may need to handle duplex TCP connections as well, where data is sent in the reverse direction. According to the TCP standard, each TCP data segment is also a valid ACK segment. If the reverse data segments would be forwarded without inserting them into the ACK shaper, the piggybacked ACK on the reverse data segment would cumulatively acknowledge all data received by the TCP receiver prior to sending the data segment, effectively rendering all ACKs invalid that correspond to the same connection and still wait in the ACK buffer. Additionally, the piggybacked ACK would acknowledge a large chunk of data at once, resulting in a likewise large data burst transmitted by the TCP sender. Such TCP sender behavior may circumvent the control loop of the ACK shaper and might trigger such large bursts that would even cause tail drops.

As shown in FIG. 6, one mechanism to avoid such a situation is to split the combined segment (ACK k+n with payload) into a pure ACK k+n and a data segment modified to carry a previous ACK k. The modified data segment can be forwarded without introducing the above situation. The pure ACK k+n can be generated by stripping the payload from the TCP segment and updating the IP total length header accordingly. Additionally, the TCP and IP checksums of the modified segments can also be recalculated. In practice such recalculation may automatically be performed by the TCP/IP stack of the underlying operating system or may be offloaded to a network card firmware.

The generated pure ACK k+n can be stored at the end of the ACK buffer and can become an instrument to control the transmission rate of the TCP sender. The ACK part of the original segment can be modified by copying the acknowledgement number from the latest ACK k that was transmitted to the TCP sender in the corresponding connection. The ACK k may be available from the ACK register corresponding to the same connection as the original segment. In case the TCP sender and receiver use the TimeStamp option, the TimeStamp (TS) related TS Value (TSval) and TS Echo Reply (TSecr) option fields can also be copied from ACK k to the resulting data segment to prevent TimeStamp reordering. Failure to copy such fields may cause the segments to violate the monotonic increase criteria of the TimeStamps and be discarded due to the mechanism protecting against wrapped sequence numbers (PAWS) at the TCP sender.

Subsequent TCP data segments may carry the same acknowledgement number in the TCP header in case the TCP endpoint generating the segments has not received new data itself. Separating the ACK part from all these segments into a pure ACK, with the same ACK number, can generate a series of duplicate ACKs.

As the original segments, ACKs combined with data, would not be treated as duplicates according to the TCP standard, this action would change the semantic of the ACK flow. In order to prevent this behavior, only the first of the identical pure ACKs (ACK k+n in FIG. 6) may be stored in the ACK buffer. Thus, the ACK handler can save the ACK number of the latest pure ACK generated for each connection and can prevent the storage of additional ACKs with the same ACK number.

Figure 7:
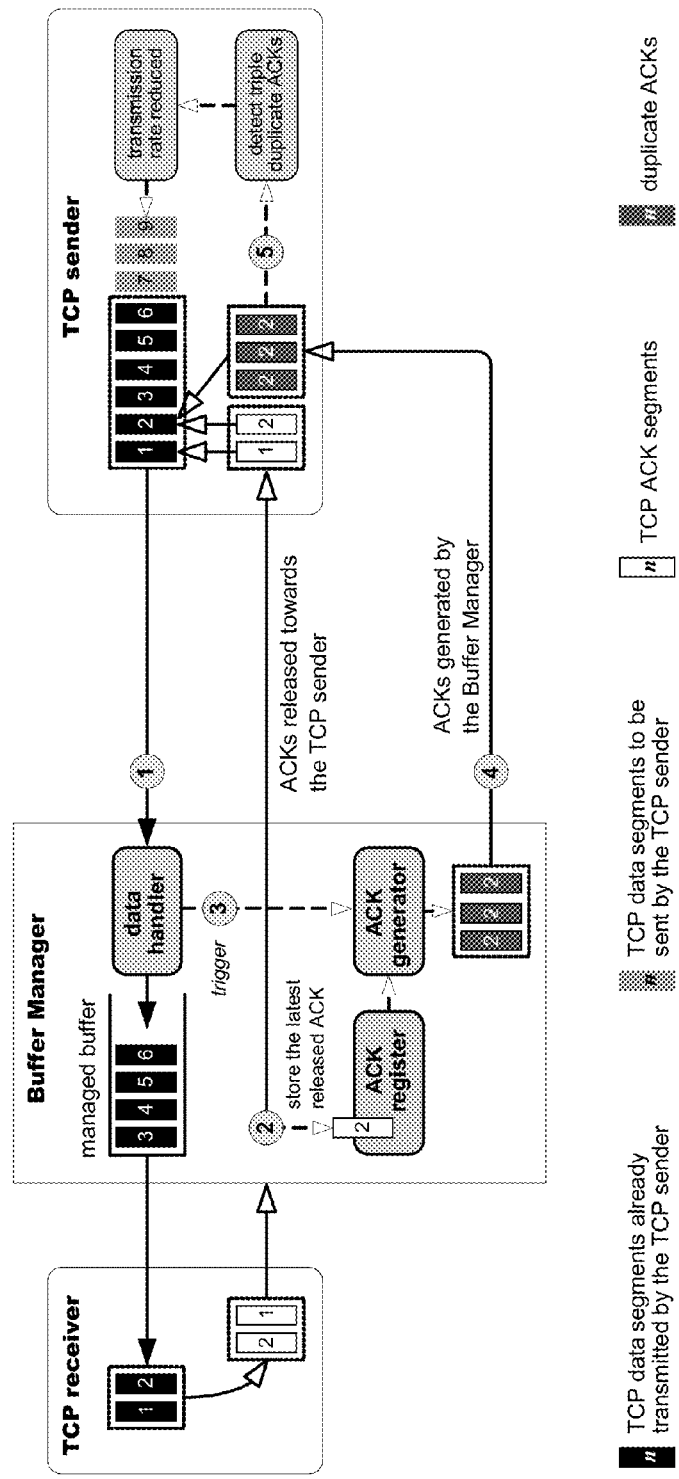
FIG. 7 illustrates the operation of a virtual discard mechanism, according to certain embodiments.

FIG. 7 illustrates the operation of a virtual discard mechanism, according to certain embodiments. The implementation of the virtual discard shown in FIG. 7 can build upon the functionality of the ACK register and can utilize two additional logical entities, the data handler and the ACK generator (see also FIG. 4).

As shown in FIG. 7, at 1 the data handler can intercept the data flow entering the managed buffer and can measure the rate of each flow separately. The per-flow measurement can enable the data handler to select the flow that has the highest impact on the buffer load as the target for virtual discard and, consequently, to maximize the impact of the virtual discard for keeping the buffer load within reasonable limits. The virtual discard may be triggered in case the load of the managed buffer exceeds a pre-defined threshold. Practically, the threshold can be set above the high threshold that defines the token generation function.

At 2, the virtual discard can utilize an ACK register as the provider of the latest ACK already forwarded to the TCP sender at any time. When the data handler has decided to trigger the virtual discard for a given flow at 3, it can instruct the ACK generator to insert the copy of that latest ACK into the reverse ACK stream. An identical copy can be inserted three times, at 4, to trigger a triple duplicate ACK at the TCP sender, which may be required to activate the TCP sender's congestion control mechanism, at 5.

As a result, the TCP sender can multiplicatively decrease its congestion window, such as to one half in case of TCP New Reno and to 70% in case of the TCP Cubic variant. Therefore, the rate at which the TCP sender may continue transmission is also multiplicatively decreased. The virtual discard mechanism may be the fastest possible way to trigger the congestion control mechanism of the TCP sender from the location of the managed buffer as the generation of the duplicate ACKs is asynchronous to the transfer of data or ACK segments in any direction. Therefore, the mechanism can trigger the TCP congestion control within one way delay between the buffer and the traffic source. Discarding the incoming data segment or a packet from the buffer at any point, even the front packet, can trigger the congestion control only with a necessarily higher latency. Therefore, the virtual discard may be a more agile mechanism than any of the AQMs that all operate via discarding data segments.

The virtual discard may not only trigger the reduction of the transmission rate at the TCP sender, but also the retransmission of data. Since in reality no data was discarded, such retransmissions would be unneeded duplicates from the TCP receiver's point of view. These segments can be detected and discarded by the data handler to avoid wasting resources in and below the managed buffer. The de-duplication can ensure that the virtual discard mechanism is fully transparent to the TCP receiver. The receiver will continuously get in-sequence segments that provide the applications with an undisrupted stream of data. In comparison, real discards such as AQM discards may result in out-of-order data arriving at the TCP receiver, which cannot be passed to the application until the necessary retransmissions are received.

The unnecessary retransmission triggered by the virtual discard can be eliminated altogether by using an ECN mechanism instead of duplicate ACKs to enforce the rate reduction at the TCP sender. This is a different use of ECN compared to the regular case when ECN markings are simply used instead of discarding segments. Regular ECN usage still has high latency similarly to actual discards, whereas using the ECN as the instrument of the virtual discard can provide low latency and prevent duplicate data.

Unlike the duplicate-ACK-based implementation that enhances standard basic TCP sender behavior, an ECN-based implementation may require explicit support from the TCP sender. The buffer manager can automatically detect the required support by checking whether the ECN capable transport (ECT) bit is set in the IP header of the segments originated from the TCP sender. In case the ECN is supported, the ACK generator can insert only a single copy of the latest ACK with the congestion encountered (CE) bit set to 1. This setting can signal to the TCP sender that the TCP sender should reduce the sender's congestion window in an identical way as if it detected packet loss via duplicate ACKs, but without entering the recovery process and retransmitting any segments. The buffer manager can selectively apply the ECN-based implementation towards those TCP senders that support ECN, while the rest can receive duplicate ACKs followed by de-duplication at the data handler.

Whenever the virtual discard is executed on a flow, further virtual discards may be prohibited for the same flow until the flow has completed its congestion control action. With a duplicate-ACK-based trigger, the recovery process may end when no more duplicate data segments arrive from the sender. With an ECN-based implementation, the end of the recovery can be explicitly signaled by the TCP sender via a congestion window reduced (CWR) bit set in the TCP header of the next data segment. In both cases, the end of the recovery can be detected by the data handler.

As mentioned above, the buffer manager may implement fair queuing in order to further improve fairness among competing flows and to reduce the latency experienced by newly starting or interactive flows. Fair queuing may involve data transmission from the managed buffer being performed in a manner that is not sequential, first-in, first-out, but being performed according to a round-robin scheduler. The scheduler can maintain a list of the active flows and a pointer to the flow to which the latest packet transferred from the buffer belongs. Each time a packet is transferred from the managed buffer, the scheduler can advance the flow pointer to the next one having data in the buffer.

In addition to the implementation of fair queuing in the managed buffer, fair queuing can be a part of the ACK buffer to prevent that the ACKs of new flows have to excessively wait in the reverse direction due to a loaded ACK buffer. Without such a mechanism, the point of the bufferbloat may be transferred from the managed buffer to the reverse direction. Alternatively, instead of implementation of a full-blown fair queuing in the ACK buffer, a flow incubation technique can be applied on the ACK buffer with similar benefits to the fair queuing. The flow incubation can involve the initial ACKs of newly starting flows bypassing the ACK buffer in the reverse direction. The number of ACKs may be defined by an incubation threshold parameter, such as a value that incubates the first 10-15 ACKs of each flow. Once exceeding the incubation threshold, all subsequent ACKs of the flow can be enqueued to the ACK buffer.

Figure 8:
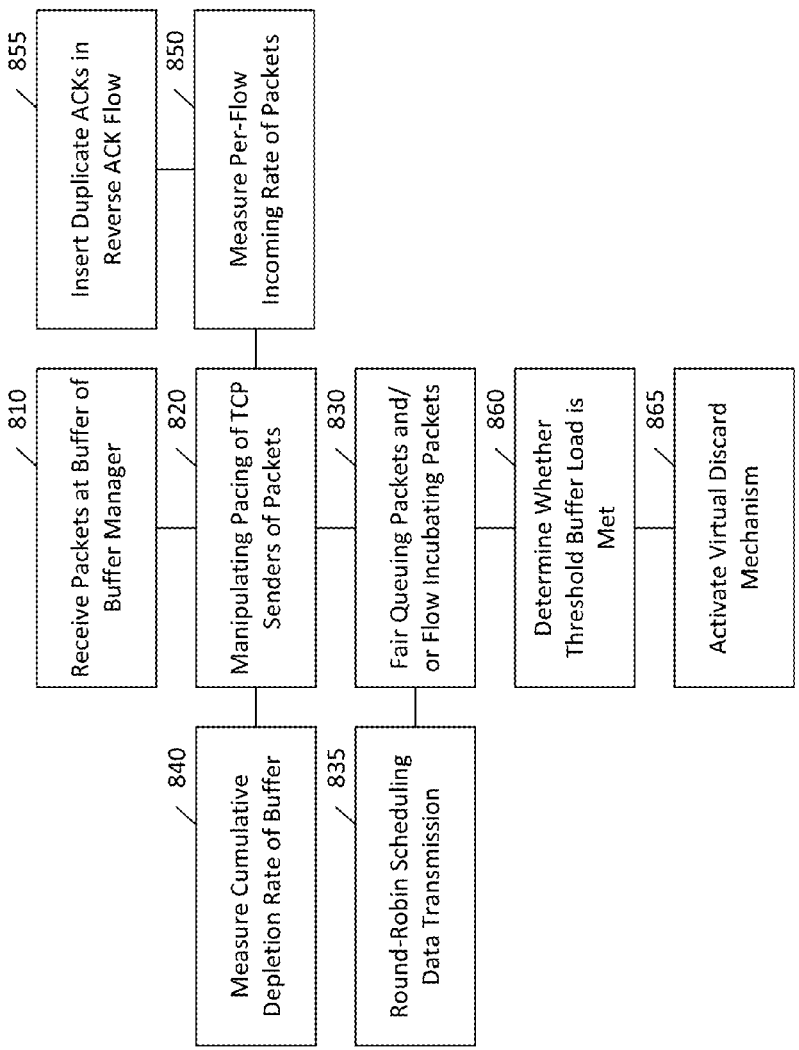
FIG. 8 illustrates a method according to certain embodiments.

FIG. 8 illustrates a method according to certain embodiments. The method can include, at 810, receiving a plurality of packets at a buffer of a buffer manager. The method can also include, at 820, manipulating, by the buffer manager, pacing of transmission control protocol senders of the packets. The manipulating the pacing can be performed by a continuously active acknowledgment shaper in the buffer manager.

The method can further include, at 830, fair queuing the packets and/or performing flow incubation on the packets. The fair queuing can include scheduling data transmission from the buffer according to a round-robin scheduler at 835. As illustrated in FIG. 1, the method can be performed in a base station or a transport device.

The method can also include, at 840, measuring a cumulative depletion rate of the buffer. The method can further include, at 850, measuring a per-flow incoming rate of packets when a virtual discard mechanism is active. The method, at 855, inserting duplicate acknowledgments in a reverse acknowledgment flow based on the per-flow incoming rate, wherein the duplicate acknowledgements are configured to trigger a transmission control protocol sender's congestion control mechanism.

The method can include, at 860, determining whether a threshold buffer load has been met. Upon a determination that the threshold buffer load has been met, the method can include, at 865, activating a virtual discard mechanism.

Figure 9:
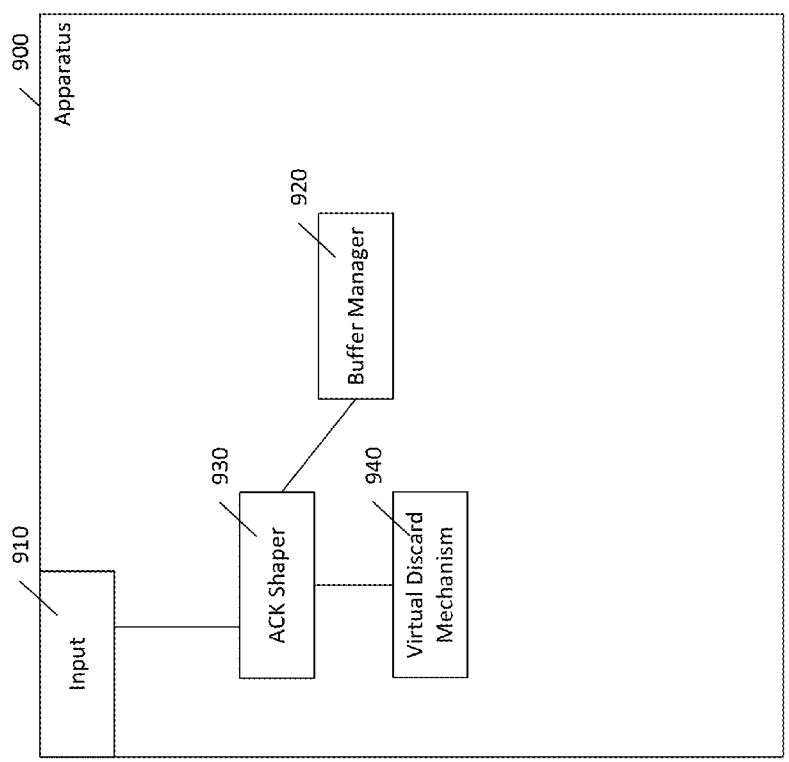
FIG. 9 illustrates a system according to certain embodiments.

FIG. 9 illustrates a system according to certain embodiments. As shown in FIG. 9, an apparatus 900 can include an input 910 configured to receive a plurality of packets at a buffer of a buffer manager. The input can be, for example, a network interface card, or other hardware configured to receive packets.

The apparatus 900 can also include a buffer manager 920 configured to manipulate pacing of transmission control protocol senders of the packets and to fair queue the packets and/or perform flow incubation on the packets. The buffer manager 920 can be any suitable device, such as the buffer managers discussed above and illustrated in the figures. The apparatus 900 can be a base station or a transport device. The apparatus 900 can also include an acknowledgment shaper 930 configured to manipulate the pacing on a continuously active basis.

The buffer manager 920 can be configured to measure a cumulative depletion rate of the buffer.

The apparatus 900 can also include a virtual discard mechanism 940. The buffer manager 920 can configured to measure a per-flow incoming rate of packets when the virtual discard mechanism is active. The virtual discard mechanism 940 can be configured to insert duplicate acknowledgments in a reverse acknowledgment flow. The duplicate acknowledgements can be configured to trigger a transmission control protocol sender's congestion control mechanism.

The buffer manager 920 can be configured to determine whether a threshold buffer load has been met, and upon a determination that the threshold buffer load has been met, to activate a virtual discard mechanism. The buffer manager 920 can be configured to fair queue by scheduling data transmission from the buffer according to a round-robin scheduler.

Figure 10:
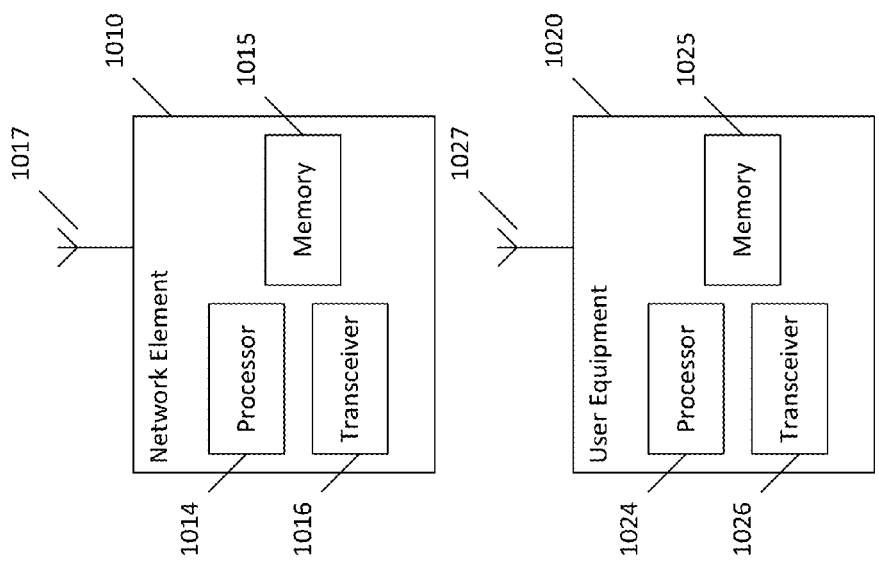
FIG. 10 illustrates another system according to certain embodiments.

FIG. 10 illustrates a system according to certain embodiments of the invention. It should be understood that each block of the flowchart of FIG. 8, and any combination thereof, may be implemented by various means or their combinations, such as hardware, software, firmware, one or more processors and/or circuitry. In one embodiment, a system may include several devices, such as, for example, network element 1010 and user equipment (UE) or user device 1020. The system may include more than one UE 1020 and more than one network element 1010, although only one of each is shown for the purposes of illustration. A network element may be a transfer node, an access point, a base station, an eNode B (eNB), server, host or any of the other network elements discussed herein. Each of these devices may include at least one processor or control unit or module, respectively indicated as 1014 and 1024. At least one memory may be provided in each device, and indicated as 1015 and 1025, respectively. The memory may include computer program instructions or computer code contained therein. One or more transceiver 1016 and 1026 may be provided, and each device may also include an antenna, respectively illustrated as 1017 and 1027. Although only one antenna each is shown, many antennas and multiple antenna elements may be provided to each of the devices. Other configurations of these devices, for example, may be provided. For example, network element 1010 and UE 1020 may be additionally configured for wired communication, in addition to wireless communication, and in such a case antennas 1017 and 1027 may illustrate any form of communication hardware, without being limited to merely an antenna. Likewise, some network element 1010 may be solely configured for wired communication, and such cases antenna 1017 may illustrate any form of wired communication hardware, such as a network interface card.

Transceivers 1016 and 1026 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that may run on a server.

A user device or user equipment 1020 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 1020 may be a sensor or smart meter, or other device that may usually be configured for a single location.

In an exemplary embodiment, an apparatus, such as a node or user device, may include means for carrying out embodiments described above in relation to FIGS. 1 through 9.

Processors 1014 and 1024 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 1015 and 1025 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors may be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1010 and/or UE 1020, to perform any of the processes described above (see, for example, FIGS. 1 through 9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 10 illustrates a system including a network element 1010 and a UE 1020, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

The buffer management mechanism according to certain embodiments may be detected in various ways, such as, for example, by observing its control actions, such as the ACK shaping and the virtual discard. This may involve monitoring the packet flow before and after the buffer in both directions. The ACK shaper may detected, in certain embodiments, by comparing the amount of data transferred from the buffer with the amount of ACKs in the reverse ACKs flow. If there is a correlation between the two volumes, it can indicate the presence of a buffer management that shapes the ACK flow according to the depletion rate of the buffer.

The virtual discard mechanism can be detected, in certain embodiments, by observing duplicate ACKs in the reverse ACK flow that were injected by the buffer management entity. In that case, the duplicate ACKs were not present in the reverse ACK flow originally generated by the TCP receiver, but they can be detected at the TCP sender.

Additionally, the presence of a de-duplication mechanism can be observed, in certain embodiments, by detecting that certain retransmitted segments originated from the TCP sender are not present among the data transmitted from the managed buffer.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

ACK Acknowledgement
AQM Active Queue Management
BM Buffer Manager
BTS Base station
CE Congestion Encountered
CoDel Controlled Delay
CWR Congestion Window Reduced
ECN Explicit Congestion Notification
ECT ECN Capable Transport
eNB Evolved Node B
FQ Fair Queuing
HSPA High Speed Packet Access
IP Internet Protocol
NZWA Non-Zero Window Advertisement
PAWS Protection Against Wrapped Sequence numbers
PDCP Packet Data Convergence Protocol
PDU Protocol Data Unit
PIE Proportional Integrated controller Enhanced
RED Random Early Detection
RLC Radio Link Control
RTT Round-Trip Time
TCP Transmission Control Protocol
TS Time Stamp
UE User Equipment
WCDMA Wideband Code Division Multiple Access
ZWA Zero Window Advertisement

We claim:

1. A method, comprising:
   receiving a plurality of packets at a buffer of a buffer manager;
   manipulating, by the buffer manager, pacing of transmission control protocol senders of the packets, wherein the manipulation of pacing comprises manipulation of transmission control protocol acknowledgment pacing;
   measuring a cumulative depletion rate of the buffer;
   coupling the rate of transmission of acknowledgements to the transmission control protocol senders to the cumulative depletion rate of the buffer, wherein the cumulative depletion rate comprises a rate at which data is transferred from the buffer;
   measuring a per-flow incoming rate of packets when a virtual discard mechanism is active; and
   inserting duplicate acknowledgments in a reverse acknowledgment flow based on the per-flow incoming rate, wherein the duplicate acknowledgments are configured to trigger a transmission control protocol sender's congestion control mechanism.

2. The method of claim 1, further comprising:
   fair queuing the packets and/or performing flow incubation on the packets.

3. The method of claim 1, wherein the method is performed in a base station or a transport device.

4. The method of claim 1, wherein the manipulating the pacing is performed by a continuously active acknowledgment shaper.

5. The method of claim 1, further comprising:
   determining whether a threshold buffer load has been met, and upon a determination that the threshold buffer load has been met, activating a virtual discard mechanism.

6. The method of claim 2, wherein the fair queuing comprises scheduling data transmission from the buffer according to a round-robin scheduler.

7. An apparatus, comprising:
   an input configured to receive a plurality of packets at a buffer of a buffer manager;
   a buffer manager configured to manipulate pacing of transmission control protocol senders of the packets, wherein the manipulation of pacing comprises manipulation of transmission control protocol acknowledgment pacing, wherein the buffer manager is further configured to measure a cumulative depletion rate of the buffer, and wherein the buffer manager is additionally configured to couple the rate of transmission of acknowledgements to the transmission control protocol senders to the cumulative depletion rate of the buffer, wherein the cumulative depletion rate comprises a rate at which data is transferred from the buffer; and
   a virtual discard mechanism configured to insert duplicate acknowledgments in a reverse acknowledgment flow, wherein the duplicate acknowledgements are configured to trigger a transmission control protocol sender's congestion control mechanism.

8. The apparatus of claim 7, wherein the buffer manager is further configured to fair queue the packets and/or perform flow incubation on the packets.

9. The apparatus of claim 7, wherein the apparatus comprises a base station or a transport device.

10. The apparatus of claim 7, further comprising an acknowledgment shaper configured to manipulate the pacing on a continuously active basis.

11. The apparatus of claim 7, further comprising:
    a virtual discard mechanism, wherein the buffer manager is configured to measure a per-flow incoming rate of packets when the virtual discard mechanism is active.

12. The apparatus of claim 7, wherein the buffer manager is configured to determine whether a threshold buffer load has been met, and upon a determination that the threshold buffer load has been met, to activate a virtual discard mechanism.

13. The apparatus of claim 8, wherein the buffer manager is configured to fair queue by scheduling data transmission from the buffer according to a round-robin scheduler.

14. A non-transitory computer-readable medium encoded with instructions that, when executed in hardware, perform a process, the process comprising:
    manipulating, by the buffer manager, pacing of transmission control protocol senders of the packets, wherein the manipulation of pacing comprises manipulation of transmission control protocol acknowledgment pacing;
    measuring a cumulative depletion rate of the buffer;
    coupling the rate of transmission of acknowledgements to the transmission control protocol senders to the cumu- lative depletion rate of the buffer, wherein the cumulative depletion rate comprises a rate at which data is transferred from the buffer;

measuring a per-flow incoming rate of packets when a virtual discard mechanism is active; and inserting duplicate acknowledgments in a reverse acknowledgment flow based on the per-flow incoming rate, wherein the duplicate acknowledgements are configured to trigger a transmission control protocol sender's congestion control mechanism.

15. The non-transitory computer-readable medium of claim 14, the process further comprising:

fair queuing the packets and/or performing flow incubation on the packets.

16. The non-transitory computer-readable medium of claim 14, the process further comprising:

determining whether a threshold buffer load has been met, and upon a determination that the threshold buffer load has been met, activating a virtual discard mechanism.

17. The non-transitory computer-readable medium of claim 15, wherein the fair queuing comprises scheduling data transmission from the buffer according to a round-robin scheduler.

* * * * *